(12) United States Patent
Sakurai et al.

(10) Patent No.: US 6,522,092 B2
(45) Date of Patent: Feb. 18, 2003

(54) LIGHT SCANNER AND PROJECTION DISPLAY DEVICE USING THE SAME

(75) Inventors: Michihiko Sakurai, Kanagawa (JP); Kazuhito Hori, Kanagawa (JP); Takuya Makino, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/923,550

(22) Filed: Aug. 7, 2001

(65) Prior Publication Data

US 2002/0047090 A1 Apr. 25, 2002

(30) Foreign Application Priority Data

Aug. 7, 2000 (JP) .......................................... 2000-238816

(51) Int. Cl.[7] .............................. G09G 1/04; B41J 2/47
(52) U.S. Cl. ....................... 315/372; 315/373; 347/255; 347/247; 347/239
(58) Field of Search ................................. 315/372, 373, 315/370, 371; 347/255, 247, 248, 234, 235, 239

(56) References Cited

U.S. PATENT DOCUMENTS 5,293,100 A * 3/1994 Swinson et al. ............ 315/364
5,485,530 A * 1/1996 Lakowicz et al. .......... 382/191
6,421,076 B1 * 7/2002 Asaya ........................ 347/234

OTHER PUBLICATIONS

"200 Inches Full Color Laser Projection Display", Youngmo Hwang, Jinho Lee, Youngjun Park, Jungho Park, Seungnam Cha, Yonghoon Kim; Part of the IS&T/SPE Conference on Projection Displays IV, Jan. 1998 SPIE vol. 3296.

* cited by examiner

Primary Examiner—Don Wong
Assistant Examiner—Tuyet T. Vo
(74) Attorney, Agent, or Firm—Lerner, David, Littenberg, Krummholz & Mentlik, LLP

(57) ABSTRACT

A structure in which first to third diodes cause signal beams which are produced by modulating image signals to be incident upon corresponding first to third light deflection scanning sections. The first to third light deflection scanning sections perform line scanning operations using the incident light signal beams. First to third light amplifiers amplify the light signal beams used for the line scanning to necessary brightnesses. A light-wave synthesizer synthesizes the amplified light signal beams into one light beam. A light post scanning section performs frame scanning using the synthesized light beam in order to project it onto a screen. Accordingly, it is possible to display a highly bright image at a low cost on a large screen that realizes high definition and color reproducibility.

15 Claims, 5 Drawing Sheets

LIGHT SCANNER AND PROJECTION DISPLAY DEVICE USING THE SAME

CROSS-REFERENCE TO RELATED APPLICATIONS

The present application claims priority from Japanese application No. P2000-238816, filed Aug. 7, 2000, the disclosure of which is hereby incorporated by reference herein.

BACKGROUND OF THE INVENTION

The present invention relates to a light scanner and a projection display device using the light scanner. More particularly, the present invention relates to a light scanner which is such as to provide a low-cost precise display of an image projected onto a large screen that realizes high definition and high color reproducibility, and a projection display device using the light scanner.

Laser beam displays provide high laser-beam monochromaticity and high laser-beam output ability. They are expected to, for example, realize a wide color reproduction range and be used as large-screen displays with higher brightness. They are also drawing attention as one possible candidate for home-theater high-definition/large displays.

Hitherto, beam scanning systems have been used in laser displays. In laser displays using beam scanning systems, a polygon mirror which rotates at a high speed so as to be in synchronization with a horizontal synchronization signal of an image signal is used to carry out horizontal scanning using a modulated laser beam. After the horizontal scanning, a galvanometer mirror is driven so as to be in synchronization with a vertical synchronization signal of an image signal through a relay lens in order to perform vertical scanning using the modulated laser beam, so that an image is projected onto a screen through a projection lens.

A beam scanning system in which a modulated laser beam is used for horizontal scanning (or line scanning) by a polygon mirror, and in which the modulated laser beam is used for vertical scanning (or frame scanning) by a galvanometer is proposed in detail in, for example, "200 Inches Full Color Laser Projection Display," SPIE vol. 3296, pp. 116–25, 1998, by Y. Hwang et al. The beam scanning system provides features such as making it possible to project an image onto a surface of any shape, change the size of an image, and change a projection direction.

Increasing the definition of a display image inevitably causes an increase in the amount of information displayed. Therefore, it is desirable that a large number of pixels be provided with the capability of allowing a display of a large number of pieces of color information. For example, for beam-scanning-type high-definition display devices, it is desirable that they be capable of, for example, allowing an increase in an image signal band and an increase in a scanning frequency. However, in the case of beam scanning systems using mechanical scanning systems, it is considerably difficult to increase scanning frequency.

More specifically, according to the above-described proposal, when a polygon mirror having 24 surfaces is rotated at a speed of 39,375 rpm, a horizontal scanning frequency of 15.75 kHz is obtained when the NTSC (National Television System Committee) system is used. However, when this signal standard is applied to the HDTV (High Definition Television) system that features 1920× 1080 60 fr/Progressive Scan, the required number of rotations is 162,000 rpm, which is approximately 4 times that in the NTSC system.

Accordingly, the technology of high-speed rotation of a horizontal scanning system using a polygon mirror has many problems that need to be solved, so that, for example, stabilization of operation during high-speed rotation and angular precision of a reflecting surface of the polygon mirror need to be achieved.

In order to realize a higher-speed beam scanning system at a low cost, a method of using a very small optical mirror having rapid response in the scanning system is drawing attention.

A very small optical mirror can mechanically provide rapid response due to an increase in device rigidity resulting from the very small size of the device and due to a reduction in the moment of inertia. This rapid response reaches a value on the order of up to 120 MHz.

Therefore, when a very small optical mirror is used in a line scanning system in place of a polygon mirror, the HDTV system and a high-definition image system can be used in the line scanning system.

However, when a very small optical mirror is used in a scanning system in place of a polygon mirror, a high-density power light beam which is radiated from a very bright light source for a large screen projection display is reflected from a scanning reflecting mirror surface having a very small area. Therefore, a portion of the high-density power light beam is absorbed by a reflecting mirror medium and is converted into heat. As a result, the temperature of the very small optical mirror system, having a small heat capacity, is increased.

In this way, when the temperature of the reflecting mirror system is increased excessively, component parts of the very small optical mirror are deformed, thereby resulting in the problem that the light-beam scanning system can no longer function as intended.

In addition, when the reflecting mirror is used for a long period of time, its performance is reduced.

SUMMARY OF THE INVENTION

Accordingly, in view of such a situation, it is an object of the present invention to make it possible to realize a large display which is low in cost, provides high precision, and achieves high color reproducibility, while restricting deformation and deterioration of a very small optical mirror caused by an increase in temperature thereof.

According to a first aspect of the present invention, there is provided a light scanner including a first scanning unit operable to perform a scanning operation in a first scanning direction as a result of reflecting light beams modulated in accordance with an image signal, the first scanning unit being driven so as to be in synchronization with a high-speed synchronization signal of the image signal; a plurality of light amplifiers operable to amplify the modulated light beams after exiting from the first scanning unit; a light synthesizer operable to synthesize the modulated and amplified light beams into one light beam; and a second scanning unit operable to perform a scanning operation in a second scanning direction as a result of reflecting the one light beam, the second scanning unit being driven so as to be in synchronization with a low-speed synchronization signal of the image signal.

In one form of the first aspect of the present invention, the first scanning unit is a very small optical mirror, and the second scanning unit is a galvanometer mirror.

In another form of the first aspect of the present invention, the first scanning unit performs the scanning operation in a horizontal direction of an image corresponding to the image signal using the modulated light beams.

In still another form of the first aspect of the present invention, an amplifying medium of each light amplifier has the form of a thin plate.

When the amplifying medium of each light amplifier has the form of a thin plate, each amplifying medium may include a rectangular light-incident end upon which the modulated light beams impinge and a rectangular light-exiting end from which the modulated light beams exit.

When the amplifying medium of each light amplifier has the form of a thin plate, each amplifying medium may include first and second areas, the first and second areas being formed of materials having different refractive indices.

When each amplifying medium includes first and second areas, and the first and second areas are formed of materials having different refractive indices, the refractive index of each second area may be smaller than the refractive index of its corresponding first area so as to confine the modulated light beams in the corresponding first area.

When each amplifying medium includes first and second areas, and the first and second areas are formed of materials having different refractive indices, each first area may include a waveguide area and a separation area, each waveguide area including a plurality of channels used to guide and amplify the modulated light beams while maintaining a modulated-light-incident-point mutual relationship, and each separation area preventing coupling between the modulated light beams guided and amplified by adjacent ones of the channels.

When each first area includes a waveguide area and a separation area, each waveguide area includes a plurality of channels used to guide and amplify the modulated light beams while maintaining a modulated-light-incident-point mutual relationship, and each separation area prevents coupling between the modulated light beams guided and amplified by adjacent ones of the channels, each waveguide area may have a greater refractive index than the refractive index of its corresponding separation area; or each separation area may have high absorptivity with respect to at least a corresponding modulated light wavelength.

In still another form of the first aspect of the present invention, the second scanning unit performs the scanning operation in a vertical direction of an image corresponding to the image signal using the one light beam.

In the light scanner of the present invention, after the modulated light is used for the scanning operation in the first direction, the light is amplified. Then, the amplified modulated light is synthesized into one light beam in order for the synthesized light beam to be used for the vertical scanning operation in the second direction.

According to a second aspect of the present invention, there is provided a projection display device including light exiting means for causing light modulated in accordance with an image signal to exit therefrom; first scanning means for performing a first scanning operation in accordance with a high-speed synchronization signal of the image signal using the modulated light that has exited from the light-exiting means; light amplifying means for amplifying the modulated light used for the first scanning operation; light synthesizing means for synthesizing the modulated light amplified by the light amplifying means; second scanning means for performing a second scanning operation in accordance with a low-speed synchronization signal of the image signal using the light synthesized by the light synthesizing means; and display control means for controlling the display of an image that corresponds to the light used for the second scanning operation.

In the projection display device of the present invention, after the modulated light has been used for the first scanning operation at a high speed by the first scanning means, the light is amplified. Then, the synthesized light beam is used for the second scanning operation at a low speed by the second scanning means.

According to a third aspect of the present invention, there is provided a method for scanning light using light beams modulated in accordance with an image signal. According to the method, a scanning operation is performed in a first scanning direction as a result of reflecting the modulated light beams using a first scanning unit, the first scanning unit being driven so as to be in synchronization with a high-speed synchronization signal of the image signal; the modulated light beams are amplified after the first scanning operation; the modulated and amplified light beams are synthesized into one light beam; and a scanning operation is performed in a second scanning direction as a result of reflecting the one light beam using a second scanning unit, the second scanning unit being driven so as to be in synchronization with a low-speed synchronization signal of the image signal.

According to a fourth aspect of the present invention, there is provided a projection display method. The projection display method includes providing light modulated in accordance with an image signal; performing a first scanning operation on the modulated light in accordance with a high-speed synchronization signal of the image signal; amplifying the modulated light after the first scanning operation; operation; synthesizing the modulated and amplified light into one light beam; performing a second scanning operation on the one light beam in accordance with a low-speed synchronization signal of the image signal; and controlling the display of an image that corresponds to the one light beam used for the second scanning operation.

DETAILED DESCRIPTION

Figure 1:
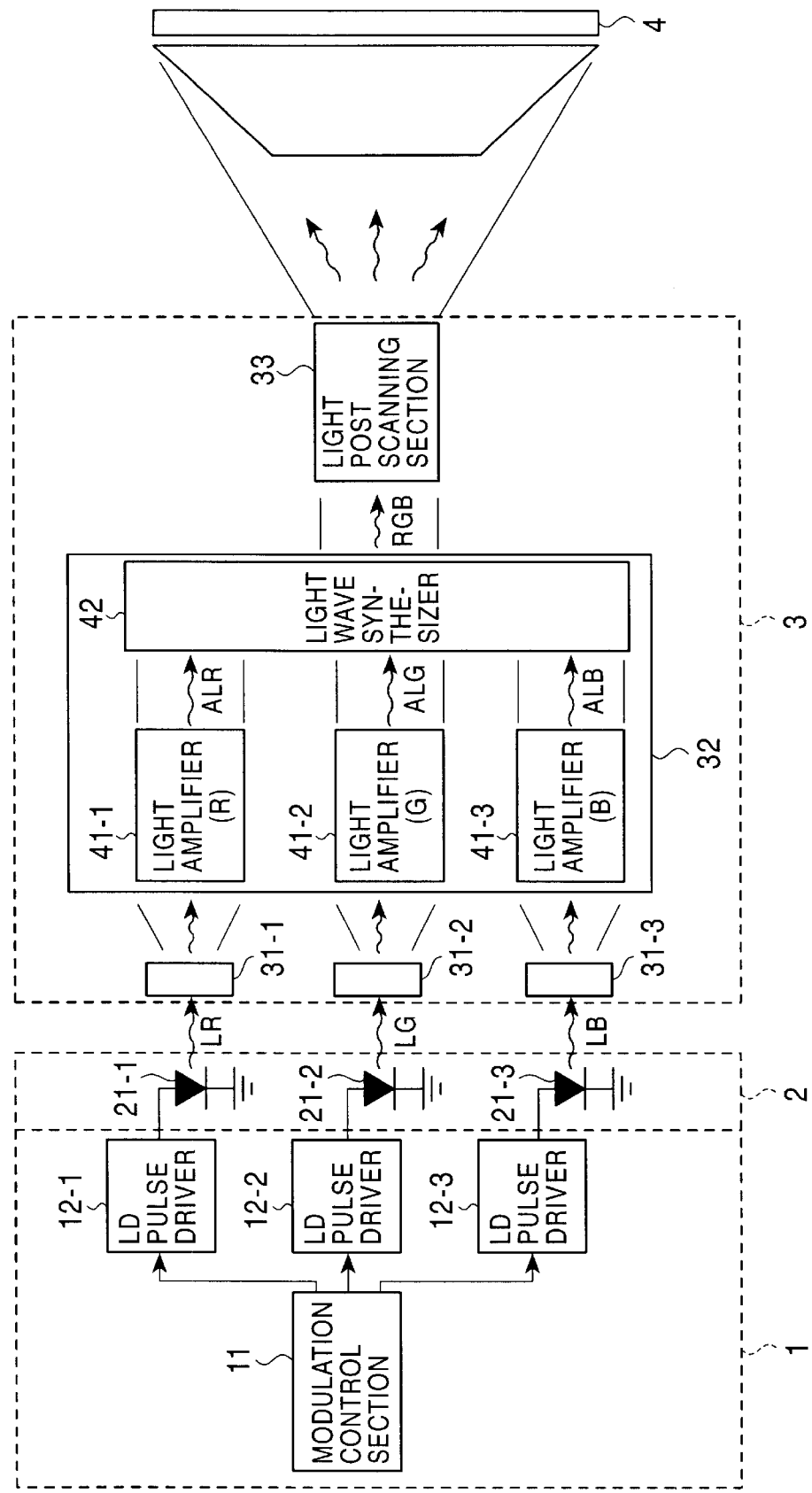
FIG. 1 is a block diagram of the structure of an embodiment of the light-beam projection display device to which the present invention is applied.

FIG. 1 is a block diagram of the structure of an embodiment of a light-beam projection display device using a light-beam scanning system of the present invention. The light-beam projection display device comprises a semiconductor laser driving circuit 1, a multicolor light source section 2, a light amplifying scanning section 3, and a screen 4.

The semiconductor laser driving circuit 1 comprises a modulation control section 11, and LD (laser diode) pulse drivers 12-1 to 12-3. (Hereafter, when it is not necessary to individually distinguish between the LD pulse drivers 12-1 to 12-3, they will be simply referred to as the "LD pulse driver(s) 12." Other component parts will also be referred to in a similar way.)

The modulation control section 11 controls electrical current used to drive the LD pulse drivers 12-1 to 12-3 by a modulation method proposed by the present applicant in, for example, Japanese Patent Application No. 11-375147.

More specifically, the modulation control section 11 operates so that a data comparator compares R (red), G (green), and B (blue) dot data values of digital image signals and count values (obtained by a counter) of pulse driving frequencies at which laser diodes (or semiconductor lasers) are pulse-driven in order to open and close pulse control gates. Then, the modulation control section 11 controls the LD pulse drivers 12-1 to 12-3 by the opening and closing of the pulse control gates in order to modulate the number of electrical current pulses used for driving laser diodes 21-1 to 21-3.

Based on modulated pulse signals supplied from the modulation control section 11, the LD pulse drivers 12-1 to 12-3 output drive electrical current pulses in order to drive the corresponding laser diodes 21-1 to 21-3 of the multicolor light source section 2.

The multicolor light source section 2 comprises the red-light emitting laser diode 21-1 that emits a red (R) light beam, the green-light emitting laser diode 21-2 that emits a green (G) light beam, and the blue-light emitting laser diode 21-3 that emits a blue (B) light beam.

The red-light emitting laser diode 21-1 is driven by the LD pulse driver 12-1, so that an incoherent red light signal beam LR is incident upon a light deflection scanning section 31-1 of the light amplifying scanning section 3. As the red-light emitting laser diode 21-1, an AlGaInP laser diode having an oscillation wavelength near the 650 nm wavelength range may be used.

The green-light emitting laser diode 21-2 is driven by the LD pulse driver 12-2, so that an incoherent green light signal beam LG is incident upon a light deflection scanning section 31-2 of the light amplifying scanning section 3. As the green-light emitting laser diode 21-2, a ZnMgSSe laser diode having an oscillation wavelength near the 520 nm wavelength range may be used.

The blue-light emitting laser diode 21-3 is driven by the LD pulse driver 12-3, so that an incoherent blue light signal beam LB is incident upon a light deflection scanning section 31-3 of the light amplifying scanning section 3. As the blue-light emitting laser diode 21-3, a ZnMgSSe laser diode having an oscillation wavelength near the 485 nm wavelength range may be used.

These light sources are not limited to the above-described laser diodes, so that, for example, light-emitting diodes (LEDs) may be used.

The light amplifying scanning section 3 comprises the light deflection scanning sections 31-1 to 31-3, a light amplifying section 32, and a light post scanning section 33.

The light deflection scanning section 31-1 performs a scanning operation in a line direction (usually a horizontal direction) as a result of deflecting the red light signal beam LR that has impinged thereupon from the red-light emitting laser diode 21-1. The light deflection scanning section 31-2 performs a scanning operation in the line direction (usually the horizontal direction) as a result of deflecting the green light signal beam LG that has impinged thereupon from the green-light emitting laser diode 21-2. The light deflection scanning section 31-3 performs a scanning operation in the line direction (usually the horizontal direction) as a result of deflecting the blue light signal beam LB that has impinged thereupon from the blue-light emitting laser diode 21-3.

The light amplifying section 32 comprises light amplifiers 41-1 to 41-3 and a light-wave synthesizer 42.

The light amplifier 41-1 amplifies to a required light intensity the red light signal beam LR that has been deflected by the light deflection scanning section 31-1 for scanning in the line direction, and causes the amplified red light signal beam LR to exit therefrom and to impinge upon the light-wave synthesizer 42. The light amplifier 41-2 amplifies to a required light intensity the green light signal beam LG that has been deflected by the light deflection scanning section 31-2 for scanning in the line direction, and causes the amplified green light signal beam LG to exit therefrom and to impinge upon the light-wave synthesizer 42. The light amplifier 41-3 amplifies to a required light intensity the blue light signal beam LB that has been deflected by the light deflection scanning section 31-3 for scanning in the line direction, and causes the amplified blue light signal beam LB to exit therefrom and to impinge upon the light-wave synthesizer 42.

The light-wave synthesizer 42, which is formed by, for example, a dichroic mirror, synthesizes an amplified red light beam ALR, an amplified green light beam ALG, and an amplified blue light beam ALB, which have been produced by their corresponding light amplifiers 41-1 to 41-3, in order to produce a synthesized light beam RGB, which impinges upon the light post scanning section 33.

The light post scanning section 33 performs a scanning operation in a frame direction (usually a vertical direction) as a result of deflecting the synthesized light beam RGB incident thereupon from the light-wave synthesizer 42, and projects the synthesized light beam RGB onto the screen 4, where a high-definition image is displayed (or reproduced).

Figure 2:
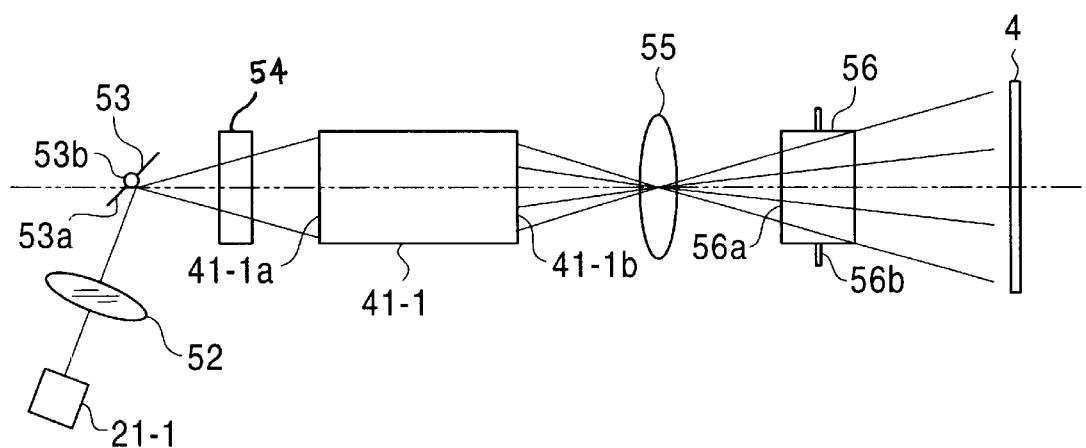
FIG. 2 is a block diagram of the structure of an optical system of the light amplifying scanning section shown in FIG. 1.

A description of the structure of one of the optical systems of the light amplifying scanning section 3 shown in FIG. 1 will now be given with reference to FIG. 2. Since the structures of the optical systems of the light amplifying scanning section 3 used for red light, green light, and blue light are the same, for the sake of simplicity, a description of the structure of the optical system of the light amplifying scanning section 3 used for red light will be taken as an example.

The red-light emitting laser diode 21-1 causes the red light signal beam, which is a modulated R component of the image signal, to exit therefrom and to impinge upon a collimator lens 52.

The collimator lens 52 causes the light signal beam that has impinged thereupon from the red-light emitting laser diode 21-1 to converge on the surface of a very small optical mirror 53 (micromirror). If the radiation angle of the light signal beam that exits from the red light emitting laser diode 21-1 or the distance between the red-light emitting laser diode 21-1 and the very small optical mirror 53 does not affect the function or the performance of a lens, it is possible not to use the collimator lens 52.

The very small optical mirror 53 comprises a very small reflecting surface 53*a* having high reflectivity with respect to at least the signal light and a rotating shaft 53*b* secured to the reflecting surface 53*a*. The very small optical mirror 53 is driven either electrostatically or by electromagnetic induction by a very small optical mirror driving circuit (not shown) so as to be in synchronization with a horizontal scanning signal of the image signal. The rotating shaft 53b is secured either to a supporting table that allows stable repetitive partial rotational movement or a freely rotatable bearing that allows stable rotational movement of the very small optical mirror 53. (Neither of these structures is shown). The rotating shaft 53b is set so that it lies near a location of the reflecting surface 53a upon which the R-light signal beam impinges from the red-light emitting diode 21-1 and so that it is substantially perpendicular to a light-incident plane formed by a normal line of the reflecting surface 53a and the R-light signal beam.

When the very small optical mirror 53 having such a structure is used to perform a scanning operation as a result of the reflecting surface 53a reflecting the red light signal beam that impinges thereupon from the red-light emitting laser diode 21-1 through the collimator lens 52, the red light signal beam is used to perform line scanning, and exits therefrom in order to impinge upon an fθ lens 54.

The fθ lens 54 causes the red light signal beam that has impinged thereupon from the very small optical mirror 53 to converge on a light-incident end surface 41-1a of the light amplifier 41-1. At this time, the light signal beam that has been used for equiangular scanning is converted into a constant-velocity scanning light signal beam by the fθ lens 54.

The light amplifier 41-1 maintains the impingement-time relative positional relationship of the red light signal beam that has impinged thereupon from the fθ lens 54 by a waveguide path structure (described later) in order to guide the wave to a light-exiting end surface 41-1b, and amplifies the intensity of the red light signal by induced emission from a light amplifying medium that has been excited by exciting light. This causes the red light signal to be amplified to a light intensity required for a predetermined display on a large screen while maintaining the waveform of the image signal. The light amplifier 41-1 is set so that a direction of a long side of the rectangular shape of the incident end surface 41-1a (that is, a side direction in FIG. 3) substantially coincides with the incident-light-beam line scanning direction. The structure of the light amplifiers 41 will be described in more detail later.

The light amplifying medium is effectively optically excited by an excitation light source which emits light having an emission wavelength that matches the absorption wavelength of the amplifier medium. For the structure (not shown) of the a medium excitation system of the excitation light source, a forward-direction excitation system that causes excitation light to be incident upon the amplifier medium from a signal light incident end surface of the amplifier medium, a backward-direction excitation system that causes excitation light to be incident upon the amplifier medium from a signal light exiting end surface of the amplifier medium, or a bi-directional excitation system that causes excitation light to be incident upon the amplifier medium from both end surfaces of the amplifier medium may be used.

After the red light signal beam that has exited from the light amplifier 41-1 has been combined with the green light signal beam and the blue light signal beam into one light signal beam by the light-wave synthesizer 42 shown in FIG. 1, the one light signal beam is projected onto a reflecting surface 56a of a galvanometer mirror 56 by a projection lens 55. At this time, the projection lens 55 converts the light signal beam into collimated light signal beams (the focal length is infinite) or converged light beams that form an image on the screen 4.

The galvanometer mirror 56 comprises the reflecting surface 56a that has high reflectivity with respect to multi-colored signal light and a rotating shaft 56b secured to the reflecting surface 56a. The galvanometer mirror 56 is driven by a galvanometer mirror driving circuit (not shown) so as to be in synchronism with a vertical scanning signal of the image signal. The rotating shaft 56b is secured to a supporting table (not shown) that allows stable repetitive partial rotational movement. The rotating shaft 56b is disposed so as to be positioned on a substantially straight-line light beam array that has exited from the light-exiting end surface 41-1b of the light amplifier 41-1.

The galvanometer mirror 56 having such a structure is used to perform a scanning operation as a result of the reflecting surface 56a reflecting the light signal beam that is incident thereupon from the projection lens 55. This causes the reflected light signal beam to be projected onto the screen 4, so that an image is displayed thereon.

In the case where the light signal beam is converted into collimated light beams by the projection lens 55, the distance between the light amplifying scanning section 3 and the screen 4 is not limited. However, in the case where the light signal beam is converted into convergent light beams by the projection lens 55, the distance between the light amplifying scanning section 3 and the screen 4 is limited within a range not causing deterioration of the image projected onto the screen 4.

Figure 3:
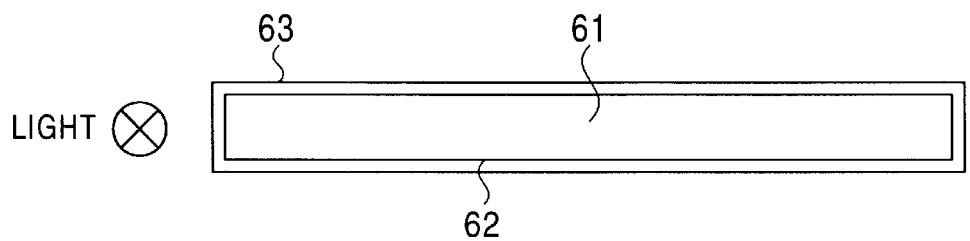
FIG. 3 is used to illustrate the structure of a ribbon-shaped light amplifier.

The structure of a general ribbon-shaped light amplifier will now be given with reference to FIG. 3. FIG. 3 shows one of the light amplifiers 41 as viewed from the light-incident end side.

A light amplifier amplification enhancing area 61 is formed by an optically transparent light amplifying medium, which is formed of, for example, PMMA or silica glass, and which is such as to transmit light to the light-exiting end. The light amplifier amplification enhancing area 61 is doped at a proper temperature with a dopant that absorbs excitation light. For the dopant, a material that has a large absorbing cross-sectional area in an excitation wavelength band or a material that has a large emission cross-sectional area in a signal light wavelength band and that allows a characteristic electron shift is used.

The details of coloring materials of the light amplifying medium are given in, for example, Japanese Unexamined Patent Publication Application No. 11-9777 filed by the present applicant.

More specifically, it is desirable that the light amplifying medium be doped with a plurality of organic coloring agents so that it possesses gain with respect to light beams having a plurality of wavelengths. Xanthene coloring agent including rhodamine 6 G, and coumarin derivatives including coumarin 1 are examples of coloring agents to which attention should be paid. These two classes of coloring agent make it possible to cover the visible range required for a full-color display.

Of signal light and excitation light that are transmitted through the ribbon-like light amplifier 41, an optical confinement layer 62 confines at least the signal light in the light amplifier amplification enhancing area 61 in order to make it possible to achieve signal amplification with high efficiency. The light confinement layer 62 guides the light signal with minimum optical loss to the light-exiting end of the light amplifier 41 while maintaining the relative positional relationship of the light-incident location of the signal light.

Therefore, the refractive index of the light confinement layer 62 is set less than the refractive index of the light amplifier amplification enhancing area 61. For example, the refractive indices of the light amplifier amplification enhancing area 61 and the light confinement layer 62 are set so that the incident numerical aperture of the light amplifier 41 is 0.3.

A covering layer 63 covers the above-described light amplifier amplification enhancing area 61 and the light confinement layer 62.

The size of the ribbon-shaped light amplifier in the depth direction thereof is adjusted in accordance with the required gain. The gain is set by adjusting design parameters such as dopant density distribution, excitation light and signal light intensity distributions, and overlapping amount of these distributions.

In the ribbon-shaped light amplifier having the structure shown in FIG. 3, the refractive index distribution in the direction of the long side of an end surface thereof is uniform, so that an incident light beam is transmitted and diffused in order to enlarge the beam size. As a result, a spacial superposition of light signals of adjacent pixels occurs, thereby reducing resolution.

Figure 4:
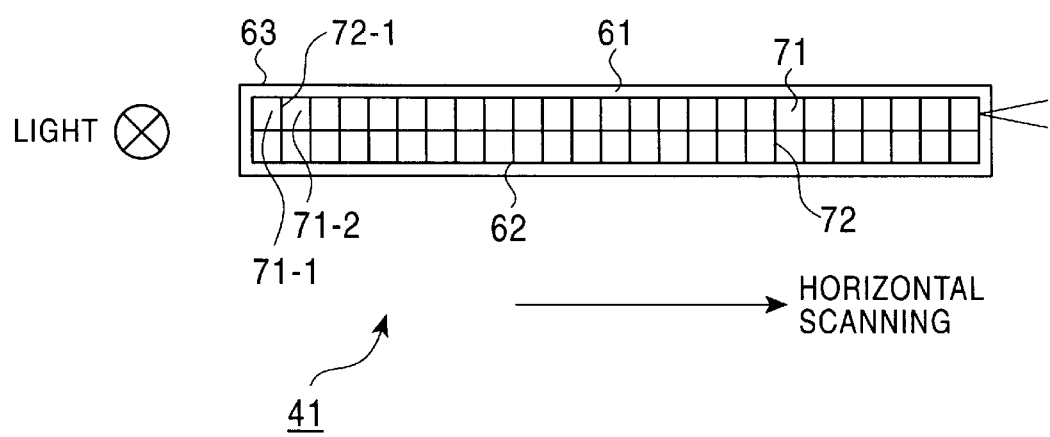
FIG. 4 is used to illustrate the structure of another ribbon-shaped light amplifier to which the present invention is applied.

In the present invention, it is possible to prevent such a reduction in resolution by constructing the ribbon-shaped light amplifier 41 as shown in FIG. 4. In FIG. 4, component parts corresponding to those shown in FIG. 3 are given the same reference numerals, and descriptions thereof are not given as required. In this structure, a light amplifying channel structure 71 and a light channel separation area structure 72 are provided. The other structural features are the same as those shown in FIG. 3.

The light amplifying channel structure 71 is a waveguide area for guiding and amplifying a wave while maintaining the relative positional relationship of the signal light incident point. One channel has an area that is equal to or less than that of a pixel. The light amplifying channel structure 71 may be formed with a polygonal or a circular shape.

In the structural example shown in FIG. 4, the light amplifying channel structure 71 is a two-row channel structure. However, the structure is not limited thereto, so that it may be a one-row channel structure. In the case of the two-row channel structure, one vertically longer beam may be used to perform a scanning operation with two rows. This causes a light signal to be effectively amplified.

The light channel separation area structure 72 is provided to restrict light signal crosstalk between channels that occurs when light signals that are guided and amplified by adjacent light amplifying channels (such as light amplifying channels 71-1 and 71-2) during transmission of light are optically coupled.

Therefore, when the optical coupling of light signals is to be prevented by the light channel separation area structure 72, the refractive index of the light amplifying channel structure 71 is such as to become greater than the refractive index of the light channel separation area structure 72.

The light amplifying channel structure 71 is, for example, formed of acrylic plastic as typified by polymethylmethacrylate (having a refractive index of 1.495), and the light channel separation area structure 72 is formed of, for example, fluorinated resin as typified by fluroacrylate (having a refractive index of 1.385).

A light channel separation area 72-1 that separates, for example, adjacent light amplifying channels 71-1 and 71-2 is formed of a material that has high absorptivity with respect to, at least, a signal wavelength.

In addition, materials that cause the refractive index of the light amplifying channel structure 71 to be greater than the refractive index of the light channel separation area structure 72 may be used. Further, materials that cause the light channel separation area structure 72 to have high absorptivity with respect to at least a signal light wavelength may be used.

A description of the operation of the light beam projection display shown in FIG. 1 will now be given.

The modulation control section 11 controls the LD pulse drivers 12-1 to 12-3, and outputs drive electrical current pulses, obtained by properly adjusting bias direct currents for superimposition, to the corresponding red-light emitting laser diode 21-1 to the blue-light emitting laser diode 21-3.

The drive electrical current pulse output from the LD pulse driver 12-1 is converted into the incoherent red light signal LR, obtained by modulating an image signal, by the red light emitting laser diode 21-1. Similarly, the drive electrical current pulses output from the LD pulse drivers 12-2 and 12-3 are converted into the corresponding green light signal beam LG and the blue light signal beam LB by the corresponding green-light emitting laser diode 21-2 and the blue-light emitting laser diode 21-3.

The red light signal beam LR, the green light signal beam LG, and the blue light signal beam LB, obtained by conversion of the output pulses by the corresponding red-light emitting laser diode 21-1, green-light emitting laser diode 21-2, and the blue-light emitting laser diode 21-3, are incident upon their corresponding light deflection scanning sections 31-1 to 31-3, where they are deflected for scanning in the line direction.

The red light signal beam LR, the green light signal beam LG, and the blue light signal beam LB that have been deflected by their corresponding light deflection scanning sections 31-1 to 31-3 for scanning in the line direction are incident upon their corresponding light amplifiers 41-1 to 41-3, where they are amplified to the necessary light intensities.

The multicolored signal beams that have been amplified by the light amplifiers 41-1 to 41-3 are synthesized into one light beam by the light-wave synthesizer 42. This one light signal beam is incident upon the light post scanning section 33, where it is deflected for scanning in the frame direction and projected onto the screen 4. This causes a high-definition image to be reproduced on the screen 4.

Figure 5:
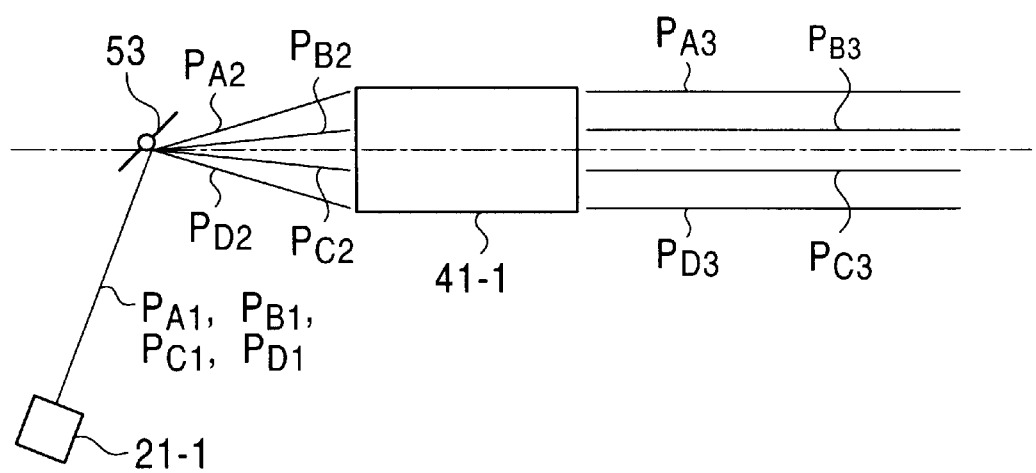
FIG. 5 is a schematic diagram illustrating the operation of a signal system of the light amplifying section shown in FIG. 1.

A description of the operation of one of the signal systems of the light amplifying section 32 shown in FIG. 1 will be given with reference to FIG. 5. Since the structures of the signal systems for red, green, and blue light are the same, for the sake of simplicity, the operation of the signal system of the light amplifying section 32 for red light will be described.

Figure 6A:
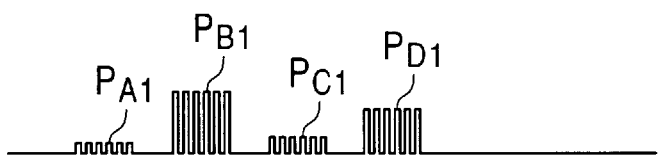
FIGS. 6A to 6I are time charts illustrating the operation of the signal system shown in FIG. 5.
Figure 6B:
Figure 6C:
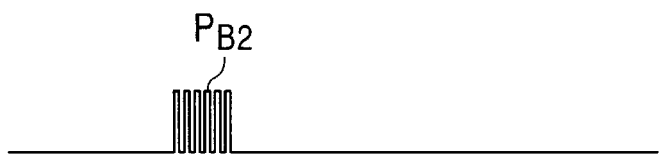
Figure 6D:
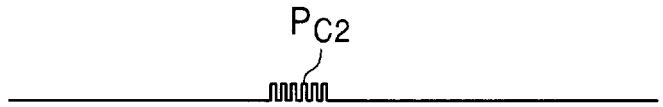
Figure 6E:
Figure 6F:
Figure 6G:
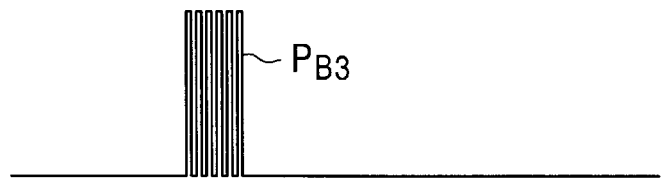
Figure 6H:
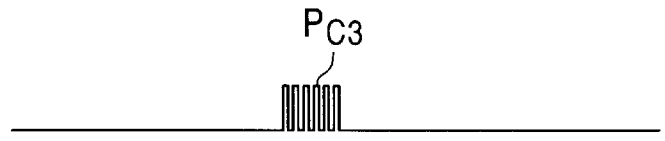
Figure 6I:
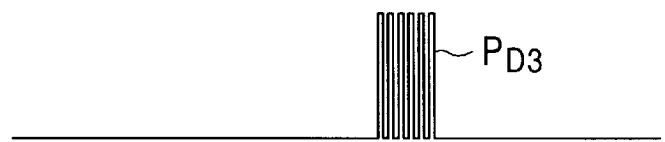

The red-light emitting laser diode 21-1 causes incoherent red light signals, obtained by modulating an image signal, to be incident upon the very small optical mirror 53. This causes red light signals PA1, PB1, PC1, and PD1, shown in the time chart illustrated in FIG. 6A, to be incident upon the very small optical mirror 53.

The very small optical mirror 53 is used for line scanning using the incident red light signals, which exit therefrom and impinge upon the light amplifier 41-1. This causes red light signals PA2, PB2, PC2, and PD2, shown in the time charts illustrated in FIGS. 6B to 6E, to be incident upon the light amplifier 41-1.

The light amplifier 41-1 amplifies the incident red light signals. More specifically, the red light signals are incident upon corresponding channels of the light amplifying channel structure 71 (shown in FIG. 4) disposed at corresponding incident points thereof. By excitation light, the light amplifying channel structure 71 amplifies the incident red light signals, and guides them with minimum optical loss to the light-exiting end while maintaining the relationship of the relative red-light-signal incident locations. This causes red light signals PA3, PB3, PC3, and PD3, shown in the time charts illustrated in FIGS. 6F to 6I, to exit therefrom.

In this way, the red light signals that have exited from the light amplifier 41-1 are used to perform a scanning operation in the frame direction by the galvanometer mirror 56 (shown in FIG. 2), and are projected onto the screen 4.

In the foregoing description, the modulated light beam that is output from the laser diode 21-1 at a low output level can be amplified to a high-output-level modulated light beam by the light amplifier 41 using an excitation light source.

More specifically, using a specific numerical example, when the output of the laser diode 21 is 2 mW, and the gain of the light amplifier 41 is 27 dB, the amplified light signal beam output from the light amplifier 41 is 1 W, so that an image can be displayed with sufficient brightness and with high resolution on a 100-inch-class large screen. In this case, line scanning using a 2 mW light signal beam only needs to be performed by the very small optical mirror 53, so that the heat capacity load becomes about 1/500 of the conventional value, which is a great improvement.

As can be understood from the foregoing description, since line scanning is carried out using a component part that precedes the light amplifier 41 (that is, the light deflection scanning section 31), and frame scanning is carried out using a component part that follows the light amplifier 41 (that is, the light post scanning section 33), and since optical coupling of light signals is prevented from occurring by the light channel separation area structure 72 of the light amplifier 41, it is possible to reproduce a high-definition image on the screen 4 while preventing a reduction in resolution. More specifically, by making use of the present invention, the following advantages are provided.

(1) Since light scanning using the very small optical mirror is carried out prior to light amplification, it is possible to minimize temperature increases in the very small optical mirror and to minimize deformation and deterioration resulting therefrom.

(2) Optical alignment during setting can be easily carried out.

(3) By carrying out the light scanning operations so that one light scanning operation is carried out using a component part that precedes each of the light amplifiers and the other light scanning operation is carried out using a component part the follows each of the light amplifiers, it is possible to reduce optical loss caused by scattering diffraction during reflection.

(4) By utilizing the very small optical mirror, it is possible to reduce the size and weight of the light scanner.

(5) In addition, by utilizing the very small optical mirror, it is possible to perform high-speed scanning, and to provide a high-resolution projection display at a low cost.

Although in the above-described embodiment, horizontal scanning is carried out using the light deflection scanning section 31, and vertical scanning is carried out using the light post scanning section 33, the present invention is not limited thereto, so that vertical scanning can be carried out using the light deflection scanning section 31, and horizontal scanning can be carried out using the light post scanning section 33.

As can be understood from the foregoing description, according to the light scanner of the present invention, after performing a scanning operation using modulated light beams in a first direction, the modulated light beams are amplified. Then, the amplified modulated light beams are synthesized into one light beam to form a synthesized light beam that is used to perform a scanning operation in a second direction. Therefore, it is possible to minimize temperature increases in the first scanning means and to minimize deformation and deterioration caused by the increase in the temperature.

In addition, according to the projection display device of the present invention, after high-speed scanning using the modulated light beams, the light beams are amplified, and a synthesized light beam is used to perform scanning at a low speed. Therefore, it is possible to realize a low-cost large display which provides precision and high color reproducibility.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A light scanner for performing scanning using light beams modulated in accordance with an image signal, the light scanner comprising:

a first scanning unit operable to perform a scanning operation in a first scanning direction as a result of reflecting the modulated light beams, the first scanning unit being driven so as to be in synchronization with a high-speed synchronization signal of the image signal;

a plurality of light amplifiers operable to amplify the modulated light beams after exiting from the first scanning unit;

a light synthesizer operable to synthesize the modulated and amplified light beams into one light beam; and a second scanning unit operable to perform a scanning operation in a second scanning direction as a result of reflecting the one light beam, the second scanning unit being driven so as to be in synchronization with a low-speed synchronization signal of the image signal.

2. A light scanner according to claim 1, wherein the first scanning unit is a very small optical mirror, and the second scanning unit is a galvanometer mirror.

3. A light scanner according to claim 1, wherein the first scanning unit performs the scanning operation in a horizontal direction of an image corresponding to the image signal using the modulated light beams.

4. A light scanner according to claim 1, wherein the second scanning unit performs the scanning operation in a vertical direction of an image corresponding to the image signal using the one light beam.

5. A light scanner according to claim 1, wherein an amplifying medium of each light amplifier has the form of a thin plate.

6. A light scanner according to claim 5, wherein each amplifying medium includes a rectangular light-incident end upon which the modulated light beams impinge and a rectangular light-exiting end from which the modulated light beams exit.

7. A light scanner according to claim 5, wherein each amplifying medium includes first and second areas, the first and second areas being formed of materials having different refractive indices.

8. A light scanner according to claim 7, wherein the refractive index of each second area is smaller than the refractive index of its corresponding first area so as to confine the modulated light beams in the corresponding first area.

9. A light scanner according to claim 7, wherein each first area includes a waveguide area and a separation area, each waveguide area including a plurality of channels used to guide and amplify the modulated light beams while maintaining a modulated-light-incident-point mutual relationship, and each separation area preventing coupling between the modulated light beams guided and amplified by adjacent ones of the channels.

10. A light scanner according to claim 9, wherein each waveguide area has a greater refractive index than the refractive index of its corresponding separation area.

11. A light scanner according to claim 9, wherein each separation area has high absorptivity with respect to at least a corresponding modulated light wavelength.

12. A light scanner according to claim 9, wherein each waveguide area has a greater refractive index than the refractive index of its corresponding separation area and each separation area has high absorptivity with respect to at least a corresponding modulated light wavelength.

13. A projection display device, comprising:
light exiting means for causing light modulated in accordance with an image signal to exit therefrom;
first scanning means for performing a first scanning operation in accordance with a high-speed synchronization signal of the image signal using the modulated light that has exited from the light-exiting means;
light amplifying means for amplifying the modulated light used for the first scanning operation;
light synthesizing means for synthesizing the modulated light amplified by the light amplifying means;
second scanning means for performing a second scanning operation in accordance with a low-speed synchronization signal of the image signal using the light synthesized by the light synthesizing means; and
display control means for controlling the display of an image that corresponds to the light used for the second scanning operation.

14. A method for scanning light using light beams modulated in accordance with an image signal, comprising:
performing a scanning operation in a first scanning direction as a result of reflecting the modulated light beams using a first scanning unit, the first scanning unit being driven so as to be in synchronization with a high-speed synchronization signal of the image signal;
amplifying the modulated light beams after the first scanning operation;
synthesizing the modulated and amplified light beams into one light beam; and
performing a scanning operation in a second scanning direction as a result of reflecting the one light beam using a second scanning unit, the second scanning unit being driven so as to be in synchronization with a low-speed synchronization signal of the image signal.

15. A projection display method, comprising:
providing light modulated in accordance with an image signal;
performing a first scanning operation on the modulated light in accordance with a high-speed synchronization signal of the image signal;
amplifying the modulated light after the first scanning operation;
synthesizing the modulated and amplified light into one light beam;
performing a second scanning operation on the one light beam in accordance with a low-speed synchronization signal of the image signal; and
controlling the display of an image that corresponds to the one light beam used for the second scanning operation.

* * * * *

UNITED STATES PATENT AND TRADEMARK OFFICE
CERTIFICATE OF CORRECTION

PATENT NO.     : 6,522,092 B2
DATED          : February 18, 2003
INVENTOR(S)    : Michihiko Sakurai, Kazuhito Hori and Takuya Nakino It is certified that error appears in the above-identified patent and that said Letters Patent is hereby corrected as shown below:

Title page,
Item [74], *Attorney, Agent or Firm,* "Krummholz" should read -- Krumholz --.

Column 4,
Line 34, cancel second occurrence of "operation;".

Signed and Sealed this

Twelfth Day of August, 2003

JAMES E. ROGAN
*Director of the United States Patent and Trademark Office*